United States Patent
Norris (10) Patent No.: US 10,788,350 B2
(45) Date of Patent: Sep. 29, 2020

(54) SUBMERSIBLE LEVEL SENSING WITH TRANSDUCER AND JACKETED CABLE

(71) Applicant: LOFA Industries, LLC, Roswell, GA (US)

(72) Inventor: Frank Norris, Roswell, GA (US)

(73) Assignee: LOFA Industries, LLC, Roswell, GA (US)

(*) Notice: Subject to any disclaimer, the term of this patent is extended or adjusted under 35 U.S.C. 154(b) by 229 days.

(21) Appl. No.: 15/881,357

(22) Filed: Jan. 26, 2018

(65) Prior Publication Data

US 2019/0234788 A1    Aug. 1, 2019

(51) Int. Cl.
| | |
|---|---|
| G01F 23/18 | (2006.01) |
| G05D 9/12 | (2006.01) |
| G01F 23/00 | (2006.01) |
| H01H 35/18 | (2006.01) |
| H01H 35/24 | (2006.01) |

(52) U.S. Cl.
CPC .......... *G01F 23/18* (2013.01); *G01F 23/0023* (2013.01); *G05D 9/12* (2013.01); *H01H 35/18* (2013.01); *H01H 35/24* (2013.01)

(58) Field of Classification Search
CPC ....... G01F 23/18; G01F 23/0023; G05D 9/12; H01H 35/18; H01H 35/24–405
See application file for complete search history.

(56) References Cited

U.S. PATENT DOCUMENTS

| | | | |
|---|---|---|---|
| 3,835,929 A | 9/1974 | Suman, Jr. | |
| 4,335,608 A * | 6/1982 | Wood ...................... | G01F 23/18 174/19 |
| 5,072,073 A * | 12/1991 | Becker ................... | H02G 1/145 156/48 |
| 5,229,176 A * | 7/1993 | Freeman ................. | B29C 63/18 428/34.7 |
| 5,426,264 A | 6/1995 | Livingston et al. | |
| 5,528,824 A | 6/1996 | Anthony et al. | |
| 6,541,706 B2 | 4/2003 | McLeod | |
| 8,443,900 B2 | 5/2013 | Fielder et al. | |

(Continued)

FOREIGN PATENT DOCUMENTS

| | | |
|---|---|---|
| CA | 2307738 A1 | 11/2000 |
| CN | 204904866 U | 12/2015 |

(Continued)

OTHER PUBLICATIONS

"KYB19 Series Submersible Level Transmitters", Xinhui KangYu Control Systems Engineering, Inc., 4 pages.

*Primary Examiner* — Paul M. West (74) *Attorney, Agent, or Firm* — Brundidge & Stanger, P.C.

(57) ABSTRACT

In a submersible liquid level sensing system, a submersible transducer senses hydrostatic pressure of a liquid in which the transducer is submerged. In at least one embodiment, a pump controller controls the on/off operation of a pump in accordance with the sensed liquid level, based on an output of the transducer. The sensed liquid level is output by the transducer to the pump controller via a cable, which is covered by a ruggedized jacket configured to be slid over the cable and attached to the transducer. The jacket may be de-attached from the transducer with the jacketed cable operably connected to the transducer.

20 Claims, 6 Drawing Sheets

(56) References Cited

U.S. PATENT DOCUMENTS

| | | | |
|---|---|---|---|
| 2002/0108757 A1 | 8/2002 | Traylor | |
| 2012/0203478 A1* | 8/2012 | Smaidris | G01F 23/165 |
| | | | 702/55 |
| 2014/0238718 A1 | 8/2014 | Tanner | |
| 2016/0047210 A1 | 2/2016 | Pinkston et al. | |
| 2016/0293294 A1 | 10/2016 | Matlack et al. | |

FOREIGN PATENT DOCUMENTS

| | | |
|---|---|---|
| CN | 205428516 U | 8/2016 |
| EP | 2801696 A2 | 11/2014 |
| RU | 2004116640 A | 10/2005 |
| WO | 2016089717 A1 | 6/2016 |

\* cited by examiner

SUBMERSIBLE LEVEL SENSING WITH TRANSDUCER AND JACKETED CABLE

TECHNICAL FIELD

The present disclosure relates to level sensing of a flowable substance and, in one or more embodiments, to liquid level sensing with a submersible transducer connected to a cable.

BACKGROUND

Submersible liquid level sensors in general may be used to measure hydrostatic pressure of a liquid in which the sensor is submerged (hereafter, a liquid level sensor alternatively may be referred to as a "sensor"). Hydrostatic pressure is proportional to the volume and density of the liquid above the sensor and thus also to the depth of the sensor. Commonly the hydrostatic pressure is converted to the depth of the sensor in accordance with the volume and density.

A submersible liquid level transducer may comprise the liquid level sensor and related structure such as a weighted "cage" or other structure, including structure known in the art; however, in this description, "transducer" may refer to the combined sensor/structure or simply to the sensor itself. The transducer may be connected to external equipment (for example, a controller) via a cable, which may include one or more electrical conductors electrically connecting the sensor to the external equipment. Because atmospheric pressure above the liquid may exert a potentially non-negligible force on the remote sensor, the sensor and/or cable may be vented to compensate.

Submersible liquid level transducers may operate at various depths in a variety of applications and environments, some of which may be inhospitable to the cable, transducer (especially the sensor), or other components of the system that includes at least the cable and the sensor. By way of nonlimiting example, a liquid level transducer may be deployed in a sewage system, fracking well tank ("frack tank"), mine, etc., sometimes in conjunction with a pump controller connected to the liquid level transducer by a cable and configured to turn on/off one or more pumps based on the liquid level sensed in the vessel. Certain system components should be protected from liquid ingress, physical stress, and corrosion to maintain performance and durability even in such environments.

Submersible liquid level transducers are sometimes fitted with a submersible "wet cable" that may comprise electrical conductors, with or without an atmospheric pressure vent tube. A wet cable may be an entirely submersible cable or a submersible portion of a longer cable (or combination of connected cables). In one or more embodiments, the cable-connected transducer may be lowered into a vessel, for example into a sewer system via an opening such as a manhole.

In one or more applications, a cable may be damaged in the normal course of operations. In the example of a sewer system, lowering a cable-connected transducer through a manhole may result in damage to the cable when dragged against the side of the manhole each time the transducer is lowered and pulled back up. A cable may also sustain damage if immersed in a corrosive liquid, or when hauled around a worksite or tossed into a vehicle with tools and other equipment, e.g. in the back of a truck. Some wet cables are not durable enough for this and other demanding applications and may fail, potentially causing the transducer electronics also to fail due to, e.g., liquid ingress to the cable.

Therefore, there is a need to increase the durability of the cable-sensor system and better protect the system components from damage.

SUMMARY

In a first aspect, a submersible liquid level sensing system comprises a submersible transducer configured to sense hydrostatic pressure of a liquid if submerged in the liquid; a cable operably connected to the transducer; and a jacket covering the cable; wherein the jacket is configured to be slid over the cable to cover the cable; and wherein the jacket is removably attached to the transducer with the jacketed cable operably connected to the transducer.

In a second aspect, a method of constructing a submersible liquid level sensing system comprises covering a cable operably connected to a transducer by sliding a jacket over the operably connected cable; and removably attaching, to the transducer, the jacket covering the cable that is operably connected to the transducer.

In a third aspect, a submersible liquid level sensing system comprises a submersible transducer configured to sense hydrostatic pressure of a liquid if submerged in the liquid; a controller configured to control an operation of an external apparatus in accordance with a level of the liquid determined based on an output of the transducer; an electrically conductive cable configured to operably connect the controller and the transducer; and a jacket covering the cable; wherein the jacket is configured to be slid over the cable to cover the cable; and wherein the jacket is removably attached to the transducer with the jacketed cable operably connected to the transducer.

DETAILED DESCRIPTION

The present disclosure relates to level sensing of a flowable substance and to liquid level sensing with a submersible transducer connected to a cable. Examples of flowable substances include liquids (such as water, oil, wastewater, etc.) and slurries (such as mixed sewage and other mixtures of one or more solids with one or more liquids), although level sensing of other flowable substances may benefit from the present teachings and is properly considered within the spirit and scope of the invention. In the present description, for convenience, "liquid" may be used to represent any flowable substance whose level may be sensed according to the disclosed embodiments, including but not limited to the above-mentioned examples. Similarly, "liquid level" may be used to represent a level of any such liquids.

One or more embodiments disclosed herein are presented in the context of sensing a level of liquid in a vessel. Such embodiments are illustrative and not intended to be limited by the context.

Figure 1:
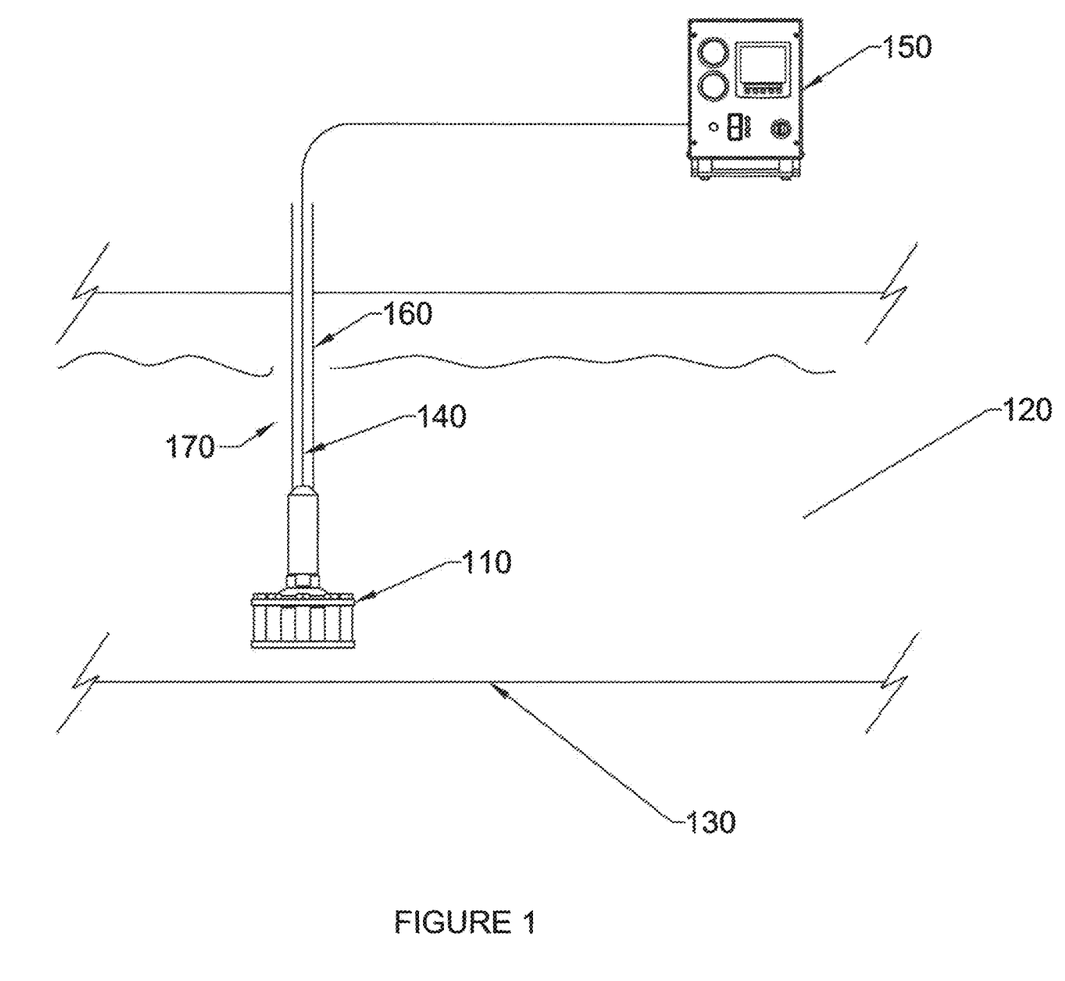
FIG. 1 illustrates a submersible liquid level transducer in accordance with one or more embodiments.

FIG. 1 illustrates a submersible liquid level transducer 110 in operation in accordance with one or more embodiments. As shown in the figure, transducer 110 may be submerged in a liquid 120 to determine the level of the liquid relative to a reference, such as the top or bottom of a vessel 130 for the liquid 120. The type or nature of vessel 130 is not limited by this disclosure and may be an open or closed vessel (e.g., tank), a natural reservoir, or any other holder of liquid, the level of which is sensed in accordance with one or more of the disclosed embodiments. Typically, the hydrostatic pressure of liquid 120 sensed by transducer 110 may be considered as proportional to the amount of liquid above the transducer and thus to the level of the liquid relative to the reference, as determined via an output of the transducer.

In one or more embodiments, transducer 110 may be operably connected to a cable 140, which may extend upward and connect to, e.g., a pump controller 150 or other external apparatus. Pump controller 150 may be operably connected to a pump (not shown) to pump water from vessel 130. In one or more embodiments, pump controller 150 may be mounted on the pump.

Without limitation, in one or more embodiments, cable 140 may be a relatively long and generally flexible "wet cable" known to the art, which may be subject to damage by repeated physical contact such as by deploying and removing cable 140 from vessel 130, dragging cable 140 along the ground, or other rough treatment. In one or more embodiments, cable 140 may be provided with a jacket 160 in a jacketed cable 170. Jacket 160 may be configured to protect cable 140 from the adverse effects of, e.g., physical stress, liquid ingress, and/or corrosion, to name three nonlimiting examples. For example, jacket 160 may comprise a hose-like structure that is rugged and yet sufficiently flexible to slip over cable 140. In addition, jacket 160 may increase tensile strength over and above that of cable 140 by itself.

In accordance with its structure, in one or more embodiments, jacket 160 may be field-replaceable (i.e., installable and/or removable) as needed, e.g. by detaching an already-installed jacket 160 from transducer 110 and sliding the detached jacket 160 off of cable 140 (or pulling cable 140 out of the detached jacket 160) without disconnecting cable 140 from transducer 110, followed by sliding a replacement jacket 160 over and onto cable 140 and connecting the replacement jacket 160 to transducer 110. Additionally; because jacket 160 is removably attached, not only may the jacket be field-replaceable with an equivalent jacket, it also may be easily field-upgradeable to a jacket having a different construction suited to the environment at hand. For example, replacement jacket 160 may be made of a different material that is resistant to a chemical in which transducer 110 and cable 140 are being submersed. Thus, a damaged jacket 160 can be replaced without replacing cable 140, which may be much more expensive or require skillsets beyond those normally in the field.

Figure 2A:
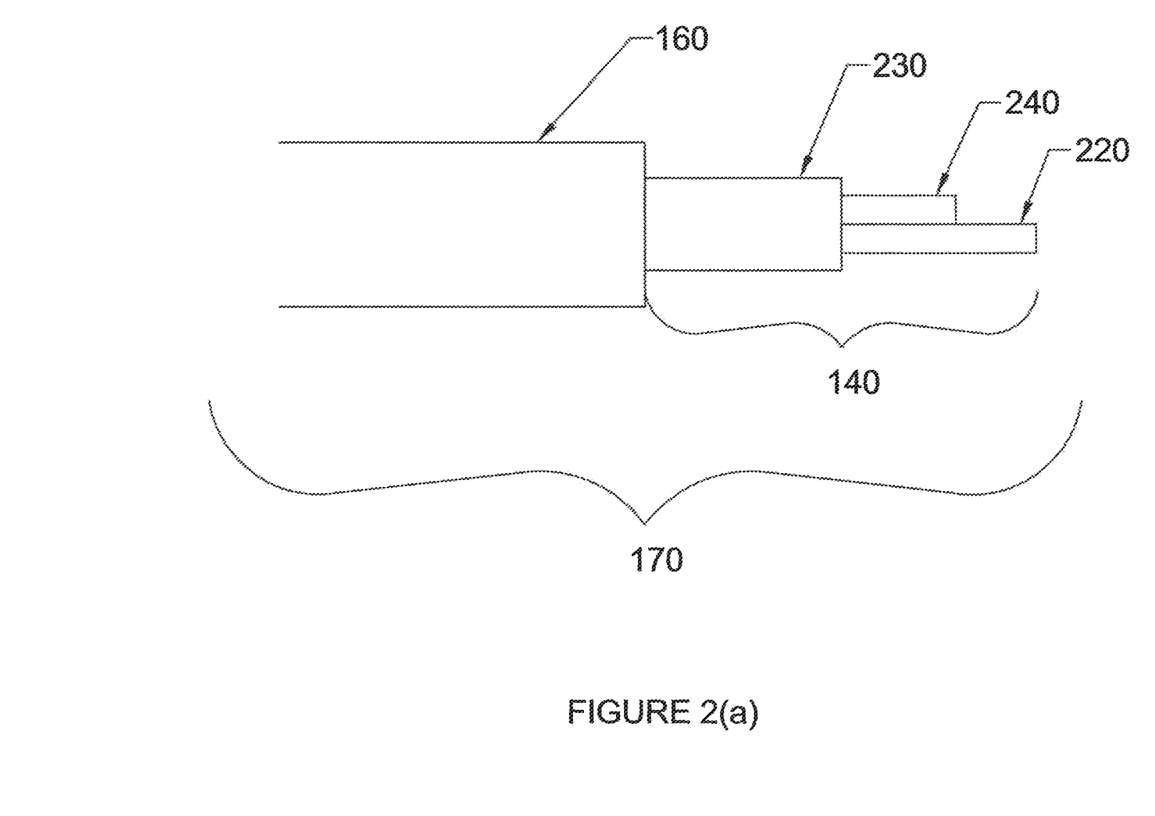
FIG. 2(a) illustrates a cable partially covered by a jacket in accordance with one or more embodiments.
Figure 2B:
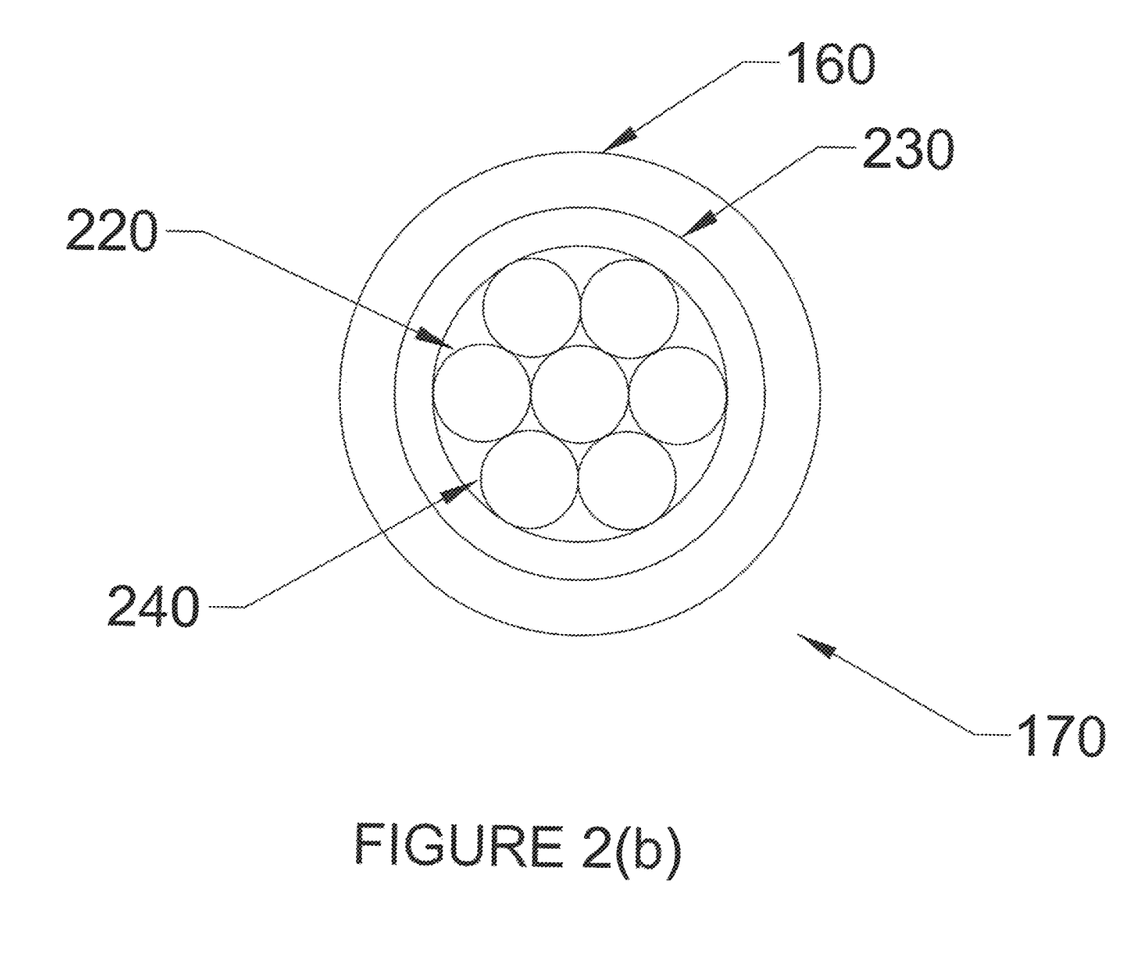
FIG. 2(b) illustrates an end view of a cross-section of a jacketed cable in accordance with one or more embodiments.

FIGS. 2(a) and 2(b) illustrate example details of jacketed cable 170, which may include at least cable 140 and jacket 160. As shown in FIG. 2(a), cable 140 may comprise one or more electrical conductors 220 (only one is shown for clarity) and one or more layers 230 surrounding conductors 220. Cable 140 may be vented with one or more vent tubes 240, although only one is shown for clarity. Additionally or alternatively, another venting scheme may be employed consistent with the scope of one or more embodiments of this disclosure.

FIG. 2(b) illustrates an end view of a cross-section of one example of jacketed cable 170. In the figure, jacket 160 surrounds and protects cable 140, of which a layer 230 surrounds and protects one or more conductors 220 and one or more vent tubes 240. Only one layer 230 is shown for clarity, although multiple layers 230 may be suitable. One of ordinary skill in the art readily recognizes that jacketed cable 170 may include other components than those shown, and that components of jacketed cable 170 can be arranged in a variety of different ways. Such alternatives are properly considered to be within the spirit and scope of the invention.

Information, including data of the hydrostatic pressure sensed by the transducer, may be output by transducer 110 and provided to, e.g., pump controller 150 via cable 140, and in turn transmitted for review and/or analysis by a human or another device, or for any other purpose. In this respect at least, the output may be more accurate and more reliably provided due to the protection afforded by jacket 160 in substantially preventing or at least reducing physical damage to cable 140 and/or the ingress of liquid 120 or other foreign matter such as sand, dirt, or sewage solids.

Figure 3:
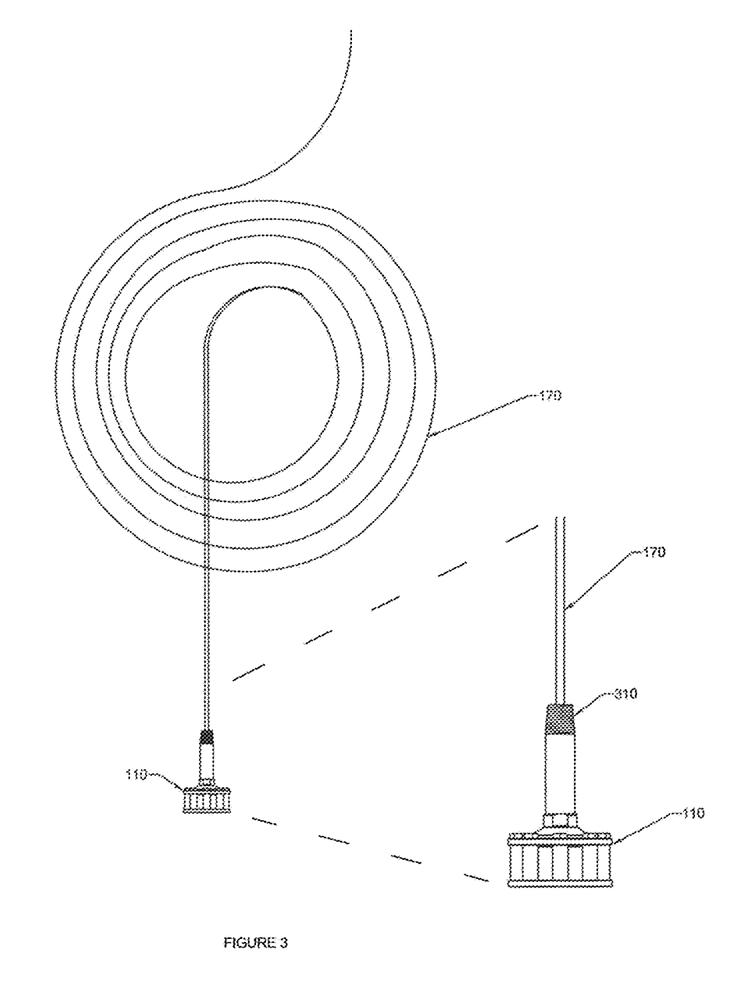
FIG. 3 illustrates a jacketed cable with attached submersible transducer in accordance with one or more embodiments.

FIG. 3 illustrates jacketed cable 170 with attached submersible transducer 110 in accordance with one or more embodiments. As illustrated in the figure, and in accordance with its rugged yet flexible construction, jacket 160 may be installed by sliding jacket 160 axially over cable 140 (or pulling cable 140 through jacket 160) and attaching a fitting 310 at the end of jacket 160 to transducer 110. For example, fitting 310 may be threadedly attached to a support structure (such as a housing) of transducer 110. In this regard, cable 140 may be operably connected to the hydrostatic pressure sensor of transducer 110, and fitting 310 may be sealed to jacket 160 by, e.g., crimping or other suitable technique, and sealingly attached to transducer 110 by, e.g., threads to provide a seal sufficient to prevent entry of liquid or other foreign matter. It should be noted that a variety of suitable attachments are contemplated and within the scope of the invention. In accordance with the attachment, jacket 160 provides a secure and protective seal in a jacketed cable-sensor system and maintain the physical and functional integrity of cable 140, permitting accurate and reliable transfer of information from transducer 110 to pump controller 150.

Figure 4:
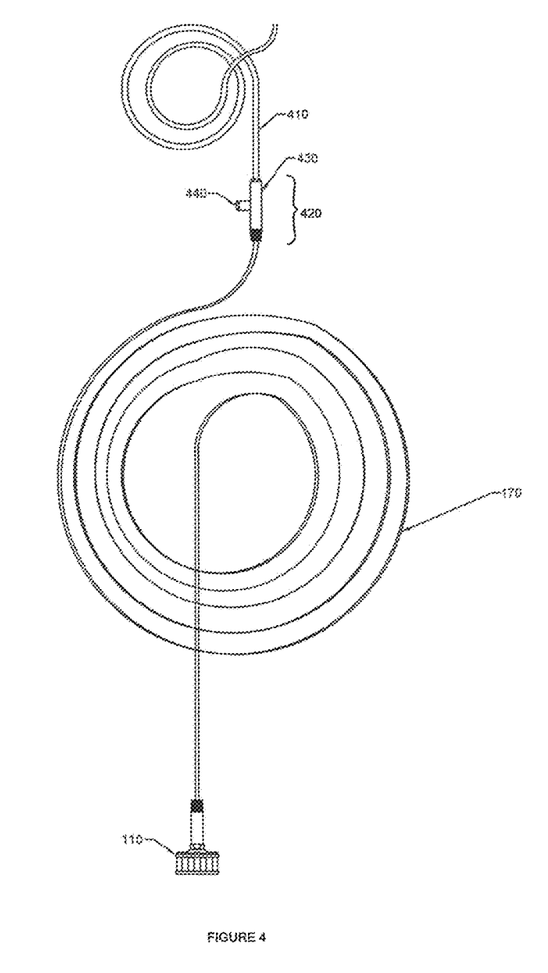
FIG. 4 illustrates two cables coupled via a junction box in accordance with one or more embodiments.

FIG. 4 illustrates two cables coupled via a junction box in accordance with one or more embodiments. In FIG. 4, by way of example only, jacketed cable 170 is shown coupled to a cable 410 via a junction box 420. Cable 410 may be a relatively long or short and generally flexible so-called "dry cable" designed and configured to remain above liquid 120 and not be submerged. In one or more embodiments, cable 410 need not have the hardiness required for submersion and thus may be less expensive than cable 140. Furthermore, cable 410 need not be provided with jacket 160, thus avoiding another expense.

In one or more embodiments, as illustrated in FIG. 4, a junction box 420 may be provided to couple cable 410 and jacketed cable 170 (for example, a dry cable 410 and a wet cable 170). Junction box 420 may include a housing 430 constructed of aluminum or other suitable material, without limitation, and a vent 440 to prevent accumulation of moisture, dirt, etc. in junction box 420 that might negatively impact the connection of cable 140 to cable 410 (in particular, the connection of conductors 220 of cable 140 to the conductors of cable 410). In one or more embodiments, vent 440 may be provided with a breathable membrane (Gore-Tex, a product of W.L. Gore and Associates, is but one example) or other structure to permit air flow but prevent contamination inside junction box 420. In this regard, junction box 420 may be constructed such that the breathable membrane is also easily field-replaceable by means of a threaded attachment, for example.

Although FIG. 4 shows junction box 420 coupling cable 410 and jacketed cable 170, junction box 420 is not so limited and can couple two jacketed cables or two non-jacketed cables as well, for example. In one or more embodiments, junction box 420 may couple a jacketed wet cable to a non-jacketed dry cable, and/or a non-jacketed wet cable to a non-jacketed dry cable. In the latter example, it may be more cost-feasible to omit the jacket 160 while still enjoying the advantages of junction box 420.

Figure 5:
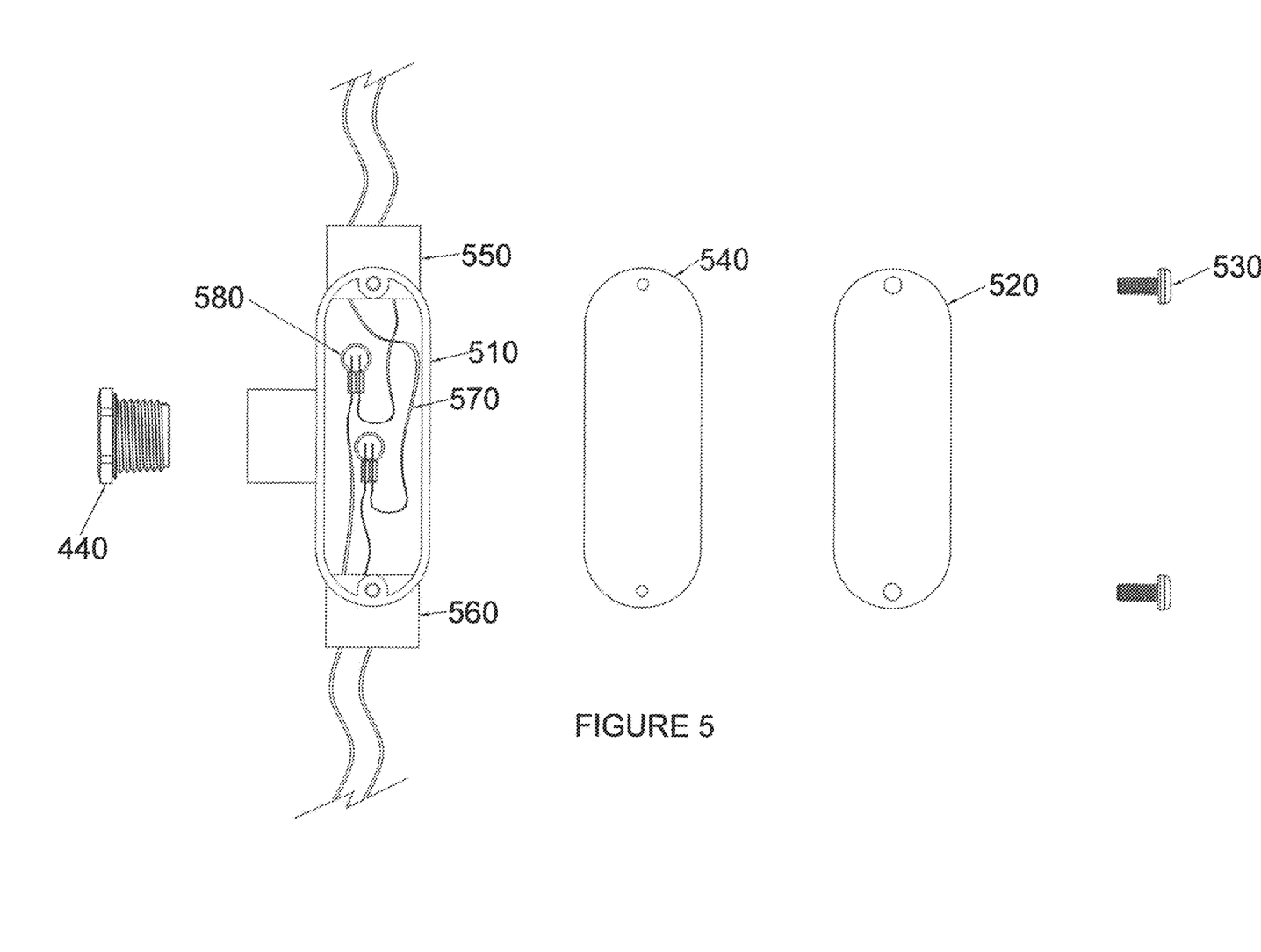
FIG. 5 illustrates a junction box opened to show an example of suitable internal components in accordance with one or more embodiments.

FIG. 5 illustrates junction box 420 opened to show an example, without limitation, of suitable features and internal components. For example, junction box 420 may comprise a shell having a base 510 and cover 520. Base 510 and/or cover 520 may be provided with a gasket 540 to protect the internal components from the environment external to junction box 420 when closed. In addition, cover 520 may be provided with screws 530 to fasten cover 520 to base 510 via corresponding holes in cover 520 and gasket 540. Other structure for fastening cover 520 to base 510 will be apparent to one of ordinary skill in the art; the illustrated structure should not be considered limiting.

Junction box 420 may be provided further with ports 550 and 560. In the illustrated example, ports 550 and 560 may provide respective connections for, e.g., dry cable 410 and wet cable 170 to be joined to junction box 420 for coupling within via, illustratively, wiring 570 and wire-splicing connectors 580. Other components, including but not limited to fuses, diodes, or other passive or active circuitry may be provided alternatively or in addition. Furthermore, junction box 420 may be given a suitable aid to viewing its interior, for example a "window," configured to prevent internal contamination. In addition, other ways to couple cable 410 and cable 170 (whether dry or wet) using junction box 420 will become apparent to one of ordinary skill based on the description, all of which are considered within its spirit and scope.

Embodiments of a device, method, and system for level sensing of a flowable substance with a submersible liquid level transducer have been disclosed. Embodiments described herein can take the form of a jacketed cable, formed for example by covering a transducer-connected cable with a jacket and fixing the jacket to the transducer with a suitable fitting. The resulting jacketed cable and attached transducer enable improved liquid level sensing with a more rugged, flexible, and reliable submersible liquid level sensor.

The disclosed jacketed cable may be employed in a variety of applications and environments which are not limited by specific examples described herein. For example, one or more of the described embodiments may be suitable for underwater cables in other uses, such as remote photography, tool manipulation, or motor control, to name but three nonlimiting examples. All such applications are contemplated and properly considered within the spirit and scope of the invention.

In one or more embodiments, factors such as hydrostatic pressure related to sensing a liquid and/or liquid level may be sensed by a transducer or functionally similar sensor and sent (e.g., by a transmitter or functionally similar communication device) for control (e.g., by a pump controller), notification, and/or analysis suitable to disclosed purposes. In the foregoing description, therefore, "transducer" may be used generally to represent a device that may perform such functions as hydrostatic pressure sensing, transmitting (e.g., of a transmitter), and other functions, commonly at the distal end of a cable. It is understood that any housing or other physical structure associated with the device may also be part of a "transducer" as the term is used. No limitation on the transducer should be inferred from the inclusion or exclusion of any such components in this disclosure.

In the present description, any or all of the terms in at least the following combinations, though potentially differentiable by one of ordinary skill in the art, may be used substantially interchangeably for convenience except as noted: "tank" and "vessel;" "determine," "sense," and "measure;" and "sensor," "sensing device," "level sensor," "liquid level sensor," and "transducer." Further, "transducer," etc. may refer to one or more of the sensor, its housing or other support structure, a transmitter, or related components physically or functionally near the sensor.

Although specific embodiments have been described, such embodiments should be considered illustrative and nonlimiting of the teachings through which the invention has advanced the state of the art. For example, although FIG. 1 shows transducer 110 and the installed jacketed cable 170 entering liquid 120 from above, no limitation on entry should be inferred. In one or more embodiments, transducer 110 may be lowered through a manhole (not shown) into vessel 130 using cable 140. Cable 140 may be a submersible wet cable configured to be submerged in liquid 120, or may comprise a submersible wet cable operably coupled to a dry cable intended to remain outside liquid 120. Additionally or alternatively, transducer 110 and/or jacketed cable 170 may be deployed to vessel 130 in or via a tube or other conduit. Moreover, in one or more embodiments, transducer 110 and the installed jacketed cable 170 may be deployed in any orientation to vessel 130 and at any location of the vessel suitable for its purpose.

An example in which jacket 160 may be field-replaceable without disconnecting cable 140 from transducer 110 has also been described. In this example, jacket 160 may be removed by sliding jacket 160 off of cable 140 at its unconnected other end. Alternatively or additionally, however, cable 140 may be disconnected from transducer 110 and removed from that end.

The foregoing description is presented to enable one of ordinary skill in the art to make and use the disclosed embodiments and modifications thereof, and is provided in the context of a patent application and its requirements. Various modifications to the disclosed embodiments and the principles and features described herein will be readily apparent to those of ordinary skill in the art. Thus, the present disclosure is not intended to limit the invention to the embodiments shown; rather, the invention is to be accorded the widest scope consistent with the principles and features described herein.

What is claimed is:

1. A submersible liquid level sensing system, comprising:
   a submersible transducer configured to sense hydrostatic pressure of a liquid if submerged in the liquid;
   a cable operably connected to the transducer; and
   a jacket covering the cable;
   wherein the jacket is configured to be slid over the cable to jacket the cable; and
   wherein the jacket is removably attached to the transducer with the jacketed cable operably connected to the transducer, wherein the jacket is field-replaceable by detaching the jacket from the transducer.

2. The submersible liquid level sensing system of claim 1, wherein the transducer includes a sensor operable to sense hydrostatic pressure of the liquid if submerged in the liquid;
wherein the cable includes an electrical conductor; and
wherein the cable is operably connected to the sensor to output information of the hydrostatic pressure sensed by the sensor.

3. The submersible liquid level sensing system of claim 2, wherein the cable comprises:
a vent tube configured to reduce an effect of atmospheric pressure on hydrostatic pressure sensed by the sensor; and
an outer layer configured to protect the conductor and vent tube from direct external contact with the jacket.

4. The submersible liquid level sensing system of claim 2, wherein the removable attachment of the jacket to the transducer is sufficient to substantially prevent ingress of the liquid to the cable along the length of the cable that is covered by the jacket.

5. The submersible liquid level sensing system of claim 1, wherein the jacketed cable is protected by the jacket from direct external contact along the length of the cable that is covered by the jacket.

6. The submersible liquid level sensing system of claim 1,
wherein the jacket covers the cable with axially slidable contact therebetween;
wherein the jacket has a first end and a second end;
wherein the first end of the jacket is removably attached to the cable and the second end of the jacket is removably attached to the transducer without being fixed to the cable along the length of the cable that is covered by the jacket between the removable attachment to the cable and the removable attachment to the transducer.

7. A method of constructing a submersible liquid level sensing system, comprising:
covering a cable operably connected to a transducer by sliding a jacket over the operably connected cable; and
removably attaching, to the transducer, the jacket covering the cable that is operably connected to the transducer,
wherein the jacket is field-replaceable by detaching the jacket from the transducer.

8. The method of claim 7,
wherein the transducer includes a sensor operable to sense hydrostatic pressure of a liquid if submerged in the liquid;
wherein the cable includes an electrical conductor; and
wherein the cable is operably connected to the sensor to output information of the hydrostatic pressure sensed by the sensor.

9. The method of claim 8, wherein the cable comprises:
a vent tube configured to reduce an effect of atmospheric pressure on hydrostatic pressure sensed by the sensor; and
an outer layer configured to protect the conductor and vent tube from direct external contact with the jacket.

10. The method of claim 8, wherein the removable attaching of the jacket to the transducer is performed sufficiently to substantially prevent ingress of the liquid to the cable along the length of the cable that is covered by the jacket.

11. The method of claim 7, wherein the covering of the cable is performed sufficiently to protect the jacket from direct external contact along the length of the cable that is covered by the jacket.

12. The method of claim 7, wherein the covering of the cable operably connected to the transducer and the removable attaching of the jacket to the transducer are performed without fixedly contacting the jacket with the cable along the length of the cable that is covered by the jacket from the removable attachment.

13. A submersible liquid level sensing system, comprising:
a submersible transducer configured to sense hydrostatic pressure of a liquid if submerged in the liquid;
a controller configured to control an operation of an external apparatus in accordance with a level of the liquid determined based on an output of the transducer;
an electrically conductive cable configured to operably connect the controller and the transducer; and
a jacket covering the cable;
wherein the jacket is configured to be slid over the cable to cover the cable; and
wherein the jacket is removably attached to the transducer with the jacketed cable operably connected to the transducer,
wherein the jacket is field-replaceable by detaching the jacket from the transducer.

14. The submersible liquid level sensing system of claim 13,
wherein the transducer includes a sensor operable to sense hydrostatic pressure of the liquid if submerged in the liquid; and
wherein the cable operably connects the sensor with the controller to output information of the hydrostatic pressure sensed by the sensor to the controller.

15. The submersible liquid level sensing system of claim 14, wherein the removable attachment of the jacket to the transducer is sufficient to substantially prevent ingress of the liquid to the cable along the length of the cable that is covered by the jacket.

16. The submersible liquid level sensing system of claim 13, wherein the cable comprises:
a vent tube configured to reduce an effect of atmospheric pressure on hydrostatic pressure sensed by the sensor; and
an outer layer configured to protect the conductor and vent tube from direct external contact with the jacket.

17. The submersible liquid level sensing system of claim 13, wherein the jacketed cable is protected by the jacket from direct external contact along the length of the cable that is covered by the jacket.

18. The submersible liquid level sensing system of claim 13,
wherein the jacket covers the cable with axially slidable contact therebetween;
wherein the jacket has a first end and a second end;
wherein the first end of the jacket is removably attached to the cable and the second end of the jacket is removably attached to the transducer without being fixed to the cable along the length of the cable that is covered by the jacket between the removable attachment to the cable and the removable attachment to the transducer.

19. The submersible liquid level sensing system of claim 13, further comprising a pump;

wherein the controller is configured to control an operation of the pump in accordance with a level of the liquid determined based on an output of the transducer.

20. The submersible liquid level sensing system of claim 19, wherein the cable operably connects the sensor with the pump controller to output information of the hydrostatic pressure sensed by the sensor to the pump controller.

* * * * *